April 19, 1966  J. FARMER  3,246,678
PINEAPPLE TREATING PROCESS AND APPARATUS
Filed Sept. 29, 1961  10 Sheets-Sheet 1

Inventor:
John Farmer
By Wilmer Mechlin
his Attorney

Inventor:
John Farmer
By Wilmer Mechlin
his Attorney

Inventor:
John Farmer
By Wilmer Mechlin
his Attorney

April 19, 1966  J. FARMER  3,246,678
PINEAPPLE TREATING PROCESS AND APPARATUS
Filed Sept. 29, 1961  10 Sheets-Sheet 4

Inventor:
John Farmer
By Wilmer Mechlin
his Attorney

April 19, 1966    J. FARMER    3,246,678
PINEAPPLE TREATING PROCESS AND APPARATUS
Filed Sept. 29, 1961    10 Sheets-Sheet 5

Inventor:
John Farmer
By Wilmer Mechlin
his Attorney

April 19, 1966 J. FARMER 3,246,678
PINEAPPLE TREATING PROCESS AND APPARATUS
Filed Sept. 29, 1961 10 Sheets-Sheet 6

Inventor:
John Farmer
By Wilmer Mechlin
his Attorney

April 19, 1966   J. FARMER   3,246,678
PINEAPPLE TREATING PROCESS AND APPARATUS
Filed Sept. 29, 1961   10 Sheets-Sheet 8

Inventor:
John Farmer
By 
his Attorney

FIG. 19

Inventor:
John Farmer
By Wilmer Mecklin
his Attorney

April 19, 1966  J. FARMER  3,246,678
PINEAPPLE TREATING PROCESS AND APPARATUS
Filed Sept. 29, 1961  10 Sheets-Sheet 10

Inventor:
John Farmer
By Wilmer Mechlin
his Attorney

United States Patent Office 3,246,678
Patented Apr. 19, 1966

3,246,678
PINEAPPLE TREATING PROCESS AND APPARATUS
John Farmer, Oahu, Hawaii, assignor to Honolulu Iron Works Company, Honolulu, Hawaii, a corporation of Hawaii
Filed Sept. 29, 1961, Ser. No. 141,680
10 Claims. (Cl. 146—238)

The invention relates to the treatment of pineapples and has for its primary object the provision of a simplified process and apparatus for use therein, whereby pineapples can be processed in a cannery much more economically than has heretofore been possible.

While attempted somewhat earlier, the mass production of canned pineapples actually began around 1914 with the introduction of the Ginaca machine or "Ginaca," as it is sometimes called. Although improvements have been made in the Ginaca from time, basically the same machine is in use in the pineapple canning industry today and invariably is used whenever pineapples are processed for producing the slices, chunks and tidbits of the solid pack. The lead machine in the conventional processing line, the Ginaca is one continuous operation sizes a pineapple by making a cylindrical cut to remove the shell and leave a fruit cylinder, cuts off the butt and crown at the ends of the cylinder, cuts out the core and finally discharges the cylinder for further processing. Conventionally, the further processing involves first inspection and hand trimming of the fruit cylinders to remove eyes, skin traces or other surface imperfections, followed by slicing of the cylinders into slices of predetermined thickness by a gang cutter which slices a pineapple in its entirely in a single sweep. Thereafter, the slices are inspected and sorted according to quality and those suitable for the fancy, choice and standard grades of the solid pack are loaded into cans, usually by hand. The remaining, so-called salvage slices, in their turn, are consigned to the less profitable crushed and juice packs.

A Ginaca is effective in sizing, end-cutting and coring a pineapple, but is one of the most expensive individual machines used by the entire fruit canning industry and the conventional process entails more hand work than does the industrial canning of any other kind of fruit. For lack of anything better, the conventional processing line has heretofore been employed in recovering fruit for the solid pack from larger pineapples, but the expensiveness of the facilities, to say nothing of that of the necessary labor, have practically barred its use in recovering solid pack fruit from small pineapples weighing less than 2½ lbs. Consequently, even though small fruit usually has the tenderest meat, generally can produce 1T size slices and represents a substantial part of the yearly crop, it is now processed for the least profitable of the packs, the juice pack, with corresponding loss to the industry.

As opposed to the conventional process, it has now been found possible to process pineapples for the solid pack without using a Ginaca and so economically as to make it commercially practicable to recover meat for the solid pack from small as well as larger fruit. It is to such a process and the apparatus required in its performance that the present invention is directed.

An object of the invention is to provide a process and apparatus for treating pineapples wherein a pineapple is sized without incident end-cutting and coring and sliced without preliminary coring, thereby not only eliminating the need for a Ginaca but preserving the relatively strong core structure for supporting the fruit during the greater part of the handling and preparation operations with consequent reduction in damage and breakage and correspondingly greater fruit recovery.

Another object of the invention is to provide a process for treating pineapples, wherein, by sizing the pineapples without end-cutting or coring, the need in the conventional process for feeding pineapples in timed sequence for sizing is eliminated.

An additional object of the invention is to provide a process for treating pineapples wherein the butt and crown cuts are performed as part of the slicing operation rather than as a separate operation in the cycle of operations of a Ginaca machine.

A further object of the invention is to provide a process for treating pineapples in which the pineapples are not only sliced before coring but the slices containing peripheral imperfections are resized to remove those imperfections and recover additional fruit for the solid pack in the form of smaller slices or tidbits, thereby eliminating the need for and labor involved in the usual trimming operation.

Another object of the invention is to provide a process for treating pineapples whereby by sizing without incident end-cutting and coring, initially inspecting without trimming to remove wholly rotten fruit, slicing with the cores intact and subsequently coring incident either to resizing or to loading, it is possible to recover fruit economically for the solid pack even from small pineapples.

Yet another object of the invention is to provide a machine for sizing pineapples with or without incident shell eradication but without incident end-cutting or coring.

A further object of the invention is to provide a simple yet effective feed for feeding pineapples to and through a sizing machine of the above described type.

A further object of the invention is to provide a machine for coring pineapple slices.

An additional object of the invention is to provide a machine for coring pineapples slices as they are resized.

Another object of the invention is to provide a machine having interchangeable means for enabling it to core pineapple slices, either with or without concurrent resizing.

Another object of the invention is to provide a machine capable in its operating cycle of coring pineapple slices and loading the meat therefrom into cans, either as slices or as tidbits into which the slices are cut in the course of loading.

A further object of the invention is to provide apparatus for coring pineapple slices whereby, as desired, the cut cores may be removed from the slices or left in place, in the latter case enabling the cores to be included in the solid pack as a novelty item for various possible uses.

Other objects and advantages of the invention will appear hereinafter in the detailed description, be particularly pointed out in the appended claims and be illustrated in the accompanying drawings, in which:

Referring now in detail to the drawings in which like reference characters designate like parts, the improved process and apparatus of the present invention are unique in enabling fruit to be recovered economically for the solid pack from pineapples which heretofore have been considered too small for the purpose, but also are adapted to treat larger pineapples and can treat such pineapples much more economically than has heretofore been possible.

Whether applied to small or larger pineapples, the essential steps in the process of this invention, in the sequence in which they are performed, are sizing, slicing and coring. The sizing operation of this invention is not the conventional sizing on a Ginaca machine followed in the machine's operating cycle by butt and crown or end cutting and by coring, but simply the making of a cylindrical cut to remove the shell and leave a fruit cylinder with its ends and core intact. The sizing operation may be and preferably is accompanied by eradication of the meat from the shell for use in the crushed and juice packs. However, even with this addition, the operation is readily performable on a machine that is much simpler and less expensive than a Ginaca machine and requires no complicated mechanism for feeding pineapples for sizing such as is necessitated by the Ginaca's cyclical operation. In turn, the slicing operation is not the conventional gang cutting of an end cut and cored fruit cylinder but the cutting of slices from a cylinder which at the time of cutting has its core and preferably also its butt and crown ends intact. The last of the essential steps, the coring, is performed on slices and, while in all cases the cores will be severed or cut from the surrounding ring of meat to form the familiar annular slices, the stage at which the fruit is cored enables the cores either to be removed or to be canned as a novelty item with the remaining meat.

As in the conventional process, it is contemplated in this process to inspect the fruit undergoing treatment at different stages. At least three such inspections will usually be necessary, one, intermediate the sizing and slicing, to eliminate fruit that is wholly rotten or otherwise unusable, another, intermediate slicing and coring, to sort out the slices suitable for canning without further preparation other than coring, and the third, performed concurrently with or following the second, to sort from the remaining slices those having edible meat salvageable for the solid pack by resizing. In the handling incident to such inspections, as well as in the slicing, the intactness of the cores at these stages has the distinct advantage over the conventional process, in which the cores are removed at the outset, of preserving or retaining the relatively strong core structures for supporting the fruit, with consequent reduction in damage and breakage. The advantage is the greater if, as in the preferred form of the process, the slices found in the second inspection to be suitable for canning without further preparation are cored as they are loaded into cans, thus preserving for this very substantial and usually larger part of the solid pack recovery the support of the cores during the entire preparation.

In the conventional process, the fruit not only is unsupported by its cores during the operation subsequent to the initial sizing, end cutting and coring by the Ginaca machine, but the eyes, skin traces and other peripheral or surface imperfections in the fruit cylinders are trimmed by hand from them before they are sliced. It is the expensiveness of the labor and the unavoidably high fruit loss involved in this trimming operation, when added to the costliness of a Ginaca machine, that has heretofore been primarily responsible for preventing meat for the solid pack from being recovered economically from small pineapples. With the expense of a Ginaca eliminated, the present process would be commercially practicable for recovering solid pack meat from small pineapples, even were all slices having peripheral imperfections consigned to the juice pack to save the cost of the trimming operation. However, such waste is unnecessary in treating either small or larger fruit if, in accordance with the process of my copending application, Ser. No. 63,451, filed Oct. 17, 1960, now Patent No. 3,036,920, the pineapples are initially sized to substantially the maximum diameter of the fruit in the waist of the shell and, instead of trimming, the imperfections are removed from the slices containing them by resizing such slices to a smaller diameter to cut off an outer ring or annulus containing the imperfections and salvage the remaining meat for the solid pack. In the case of larger pineapples, the resized, as well as the initial slices, will ordinarily be of a size suitable for canning as slices. This does not hold true of small pineapples, since the initial slices obtainable from them will usually be of 1T size, the smallest of the standard sizes. Nonetheless, resizing of the imperfect initial slices produced from the small pineapples is practicable for enabling the edible meat to be recovered by the resizing either for the crushed pack or in tidbit form for the solid pack.

In its preferred form, the process of this invention, as applied to pineapples of all sizes, thus will include, in addition to the basic steps of sizing, slicing and coring, eradication of the edible meat from the shells as the latter are removed in the sizing operation, inspections at least immediately before and after the slicing and, in lieu of trimming the fruit cylinders from the sizing operation, resizing of selected slices from the slicing operation to recover the edible meat for the solid pack from imperfect portions of the fruit. There are important additions to the preferred form of the process. One is the loading of the slices into cans. Another is the manner in which the butts and crowns or ends are cut from the pineapples. These ends must be removed at some stage and are usable to produce juice or, in the case of larger pineapples, some edible fruit for the crushed pack. As mentioned earlier, they are not removed in the present process incident to the initial sizing, since this would entail a machine of a complexity and cost comparable to a Ginaca. While this economically imposed limitation does not rule out end cutting to remove the butts and crowns after or even before the fruit is sized and before it is sliced, it usually will be more economical and preferable to slice off the ends in the course of the slicing operation in which the fruit cylinders are cut into slices of the desired thickness. This would be difficult with a conventional gang cutter which also would find difficulty due to its wedging action in slicing pineapples with their cores intact due to the relative strength of the core structure, but it is feasible with the single cut slicer described in my copending application, Ser. No. 857,035, filed Dec. 3, 1959, now Patent No. 136,348. The preferred process therefore includes end or butt and crown cutting incident to or as part of the slicing operation.

Although the process, in both the above essentials and preferred addenda, will be the same, regardless of the sizes of the pineapples to which it is applied, some differences in details are to be expected in treating fruit of the wide range of sizes obtained in the annual pineapple crop. To simplify applications of the process to pineapples of different size, the full size range of the yearly crop conveniently can be divided by weight into four groups, each covering a particular part of the range and including pineapples so alike as to be treatable effectively by the same detailed process. Starting at the bottom, the first of these groups will contain small fruit of less than 2½ lbs., the second, lower medium fruit of from 2½ to 3¼ lbs., the third, upper medium fruit of from over 3¼ lbs. to 4½ lbs. and the last, large fruit weighting over 4½ lbs. Of the average annual crop, the small and large fruit together make up about 40% and the medium fruit the balance, with this balance substantially equally divided between the lower and upper medium groups. The difference is not only in size but in texture, the edible meat of the small and lower medium fruit being of fine texture and at least the slices from such fruit that are not spotted by eyes or other imperfections generally being of a quality suitable for packing as the top fancy grade, while even the unspotted or unblemished initial slices from the upper medium and large fruit may fall into any of the three grades into which the solid pack is customarily divided, fancy, choice and standard. Consequently, it is practicable in the processing lines for the small and lower medium fruit to make provision for the loading of all of the unspotted slices from the initial slicing as meat of the same top grade, while in the lines for the upper medium and large fruit the unspotted slices must be inspected and sorted for loading as meat of the three different grades and a like provision should be made for loading the meat from the resized slices. In turn, the meat from the resized slices of the lower medium fruit usually will differ sufficiently in quality as to require its division for loading between the two higher grades, fancy and choice.

The sizing as well as the loadings will differ for the different size ranges, an initial sizing suitable for small fruit being to size 1T in terms of standard can sizes, with the second sizing sufficiently smaller to remove the eyes and other peripheral spots. For the lower medium fruit, the initial sizing may be to size 2½ with the resizing to size 2T. The upper medium fruit also may be sized initially to size 2½ but due to its larger size is adapted for resizing to size 2. While the small and medium fruit thus may be sized for canning of at least part of their meat as slices, this, as explained in my copending application, Ser. No. 89,826, filed Feb. 16, 1961, is not economically sound for large fruit. Thus, in applying the present process to such fruit, there should be a plurality of resizings and both they and the initial sizing should be such as to produce chunks and cubes for the solid pack, rather than slices.

As exemplary of applications of the process to the foregoing groups of fruit, two processing lines have been illustrated, one for small and the other for lower medium fruit. Of the exemplary lines, the small fruit line expectedly is the simpler. It is designed to process from 200 to 300 fruit per minute, can readily be fed by one operator and requires but 5 to 10 additional operators, depending on the nature of the pack. With the goal to hold the cost of processing to a minimum in both labor and apparatus, the illustrated line has been reduced to the simplest possible terms by providing for resizing but salvaging the edible meat from the resized slices for the crushed pack rather than as tidbits for the solid pack.

Figure 1:
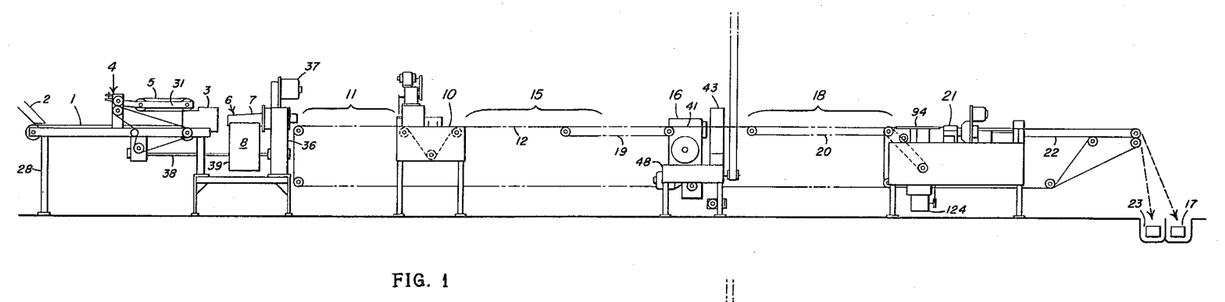
FIGURE 1 is a somewhat schematic side elevational view of a line for processing small fruit in accordance with the present invention.
Figure 2:
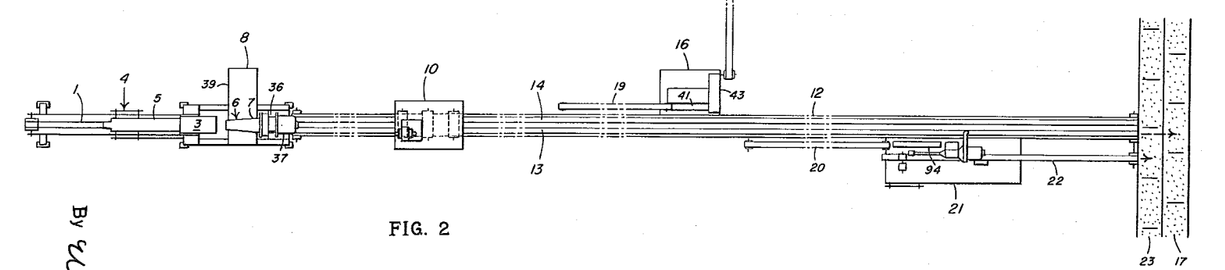
FIGURE 2 is a plan view of the line of FIGURE 1.

Starting at its head or feed end, the small fruit line is comprised of a feed conveyor 1 conveniently loadable through a hand-feed loading chute 2 and, unlike the conventional multiple pusher conveyor of a Ginaca, designed simply to feed pineapples irregularly or haphazardly, without any timed sequence, through a centering head 3 of conventional type and into and through a sizer or sizing machine 4. In this action, the feed conveyor 1 is assisted by an overlying spring-loaded driven belt 5 to which it brings the fruit from the chute 2 and with which it grips and positively feeds the fruit such that each pineapple is driven to and through the rotary tubular sizing knife 6 of the sizer 4 by the driving force on succeeding pineapples. Conventional in being cylindrically-throated and having a forwardly tapering outer surface 7 for splitting the shells as they are cut from the fruit cylinders, the preferred sizing knife 6 is unconventional in having a substantially horizontal axis, the positive feed and lack of associated means for end-cutting and coring rendering unnecessary the downward inclination of the conventional Ginaca knife to provide a gravity assist for forcing fruit cylinders through its throat.

Preferably fitted with a shell eradicator 8 of conventional type for eradicating the meat from the shells as they drop off the sizing knife 6, the sizing machine 4 discharges the fruit cylinders or sized fruit onto an endless belt or conveyor 9 which, by a suitable arrangement of pulleys, may be made to extend the length of the line beyond the sizing machine for enabling it to conduct or carry the fruit through the various subsequent inspection and treating stations. Whether or not it continues to the end of the line, the endless conveyor 9 onto which the fruit cylinders are discharged by the sizing machine at least extends to a slicer or slicing machine 10, which, as mentioned earlier, preferably is a single cut slicer, such as described in my copending application, Serial No. 857,035, filed on Dec. 3, 1959, adapted by a scroll feed and single rotary blade (not shown) to slice the fruit cylinders transversely as they pass therethrough into slices of the desired thickness and in process cut off the butts and crowns or ends of the cylinders. Prior to the slicing, the fruit on the conveyor 9 is given its first inspection at the inspection station designated as 11 in the area along the belt 9 between the sizing machine 4 and the slicer 6, the preferred inspection being unaccompanied by any trimming and solely for the purpose of culling or sorting out any wholly rotten or otherwise unusable fruit which thereupon is removed from the line for processing elsewhere for by-products.

As the fruit cylinders are sliced, they are ejected or discharged onto a main or inspection endless belt or conveyor 12 of which, as previously mentioned, the intermediate conveyor 9 between the sizing machine and slicer may be a part and which conveniently extends to the end of the line for carrying or conveying the pineapple slices therealong. To facilitate either mechanical or, more usually, manual handling of the slices as it presents them for further processing, the main conveyor 12 is formed, fitted or provided with a plurality of transversely spaced, parallel grooves or concave tracks of a contour or form to accommodate to receive and support the slices on edge or upright. In this small fruit line, the conveyor preferably has two such tracks, one an inspection track 13 aligned with the slicer 6 to receive and support the slices as they are discharged therefrom and the other a sorting track 14.

The second inspection to which the small fruit is subjected takes place at a second inspection station 15 occupying the area along the main conveyor immediately beyond the slicer 6. In this inspection, with the slices standing upright in the inspection track 13, the perfect slices are identified and sorted from the remainder, this readily being accomplished by transferring or shifting the perfect slices to the sorting track 14, leaving on the inspection track the slices spotted with eyes, skin traces or other peripheral imperfections, as well as the butts and crowns cut off in the slicer. Beyond the second inspection station, the perfect slices are transferred, shifted or removed from the sorting track 14 for coring and loading into cans, here the No. 1T cans, for which the small pineapples were sided. Rather than perform these operations separately, use is made at this stage of a coring and can loading machine 16, hereinafter to be described in detail, which conveniently is positioned alongside the main conveyor adjacent the sorting track and has an endless feed belt 19 conforming in contour to and paralleling the track onto which the perfect slices are shifted, the machine loading the slices as either slices or tidbits and with or without the cores, depending on the preference. If not loaded at this stage, the cores will usually be consigned to the juice pack and for this purpose may be returned to the sorting track for carrying by the main conveyor 12 to the end of the line, where they are dropped onto a preferably flighted cross conveyor 17 and transported thereby to another part of the plant for processing for juice.

In order to salvage edible meat from the fruit left over from the initial sorting, the slices in the inspection track 13 are subjected to a further inspection and sorting, preferably at a station designated at 18 along the line beyond the coring and can loading machine 16, and those whose imperfections are limited to their peripheral portions are selected and sorted for coring and resizing. As in the case of the perfect slices, it is contemplated that the operations on the selected salvage slices will be performed as one continuous operation rather than separately. To this end, the selected slices, as they are sorted, are transferred to an endless feed belt 20 of a coring and resizing machine 21, hereinafter to be described in detail. For ready access to the slices, the coring and resizing machine conveniently is positioned at the inspection track side of the main conveyor 12 with its feed belt running adjacent and parallel to the inspection track. As mentioned earlier, the cored and resized slices from the small fruit are too small for canning as slices but are cannable as part of the solid pack in the form of tidbits and, if desired, can be cut in such form in the course of their processing by the coring and resizing machine. However, to simplify the processing, the illustrated line makes no provision for cutting and loading the resized slices as tidbits, and instead, discharges them onto an endless discharge conveyor 22 paralleling the main conveyor by which they are carried to the end of the line and dropped or deposited on a preferably flighted cross conveyor 23 conveniently paralleling the juice conveyor 17 and leading to a part of the plant in which the resized slices are loaded as part of the crushed pack.

After the slices selected for resizing have been removed, there will remain in the inspection track 13 the butts and crowns cut off in the slicing operation, as well as the slices too spotted to admit of recovery of their edible meat by resizing. Even though not economically salvageable in any part for the solid and crushed packs, these remaining slices are processable for juice and as they reach the end of the line accordingly are dropped or deposited in the juice conveyor 17 for transport for such processing.

Figure 3:
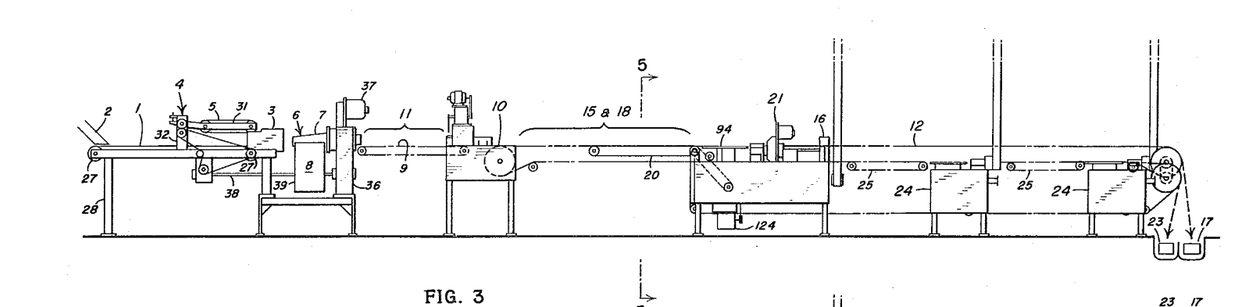
FIGURE 3 is a side elevational view of a line for processing larger fruit in accordance with the present invention.
Figure 4:
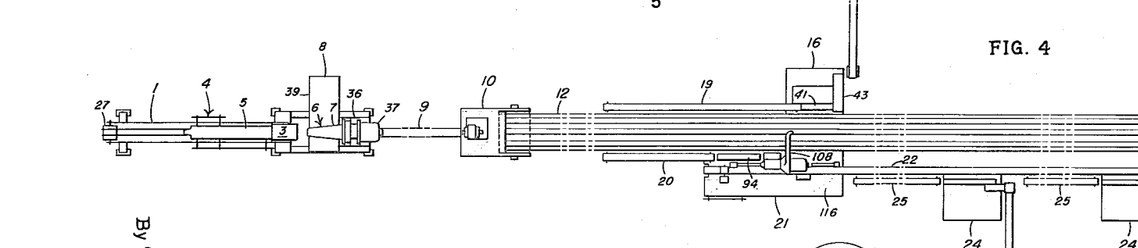
FIGURE 4 is a plan view of the line of FIGURE 3.
Figure 5:
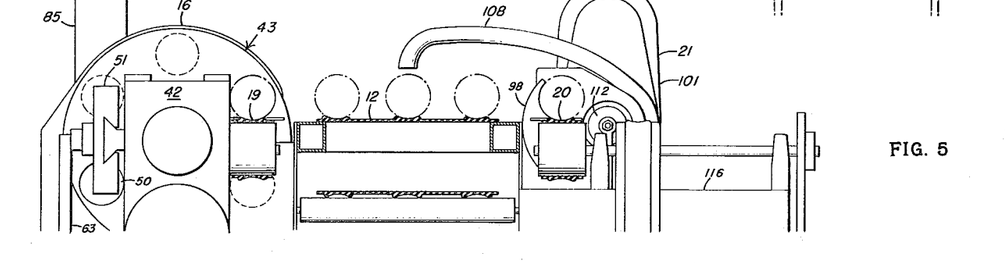
FIGURE 5 is a vertical sectional view on an enlarged scale taken along lines 5—5 of FIGURE 3.

The exemplary processing line for lower medium fruit illustrated in FIGURES 3 and 4, although much simpler than the conventional line, is somewhat more complex than that for small fruit. However, in their foreparts the preferred two lines are identical. Thus, at its head or feed end the line here under discussion also has a feed conveyor 1 fed from a chute 2 and a spring-loaded belt 5 cooperating with the feed conveyor for positively feeding pineapples through a centering head 3 of conventional type into and through the preferably horizontally disposed tubular rotary sizing knife 6 of a sizing machine 4, the latter being fitted with the preferred eradicator 8 for eradicating meat from the shells removed in the sizing. Again, as in the small fruit line, the sizing machine or sizer 4 discharges onto an intermediate endless belt or conveyor 9 along which at a first inspection station 11 the sized fruit cylinders are given their first inspection and from which wholly rotten or otherwise unusable fruit is removed for by-product processing.

Although in this line the intermediate and main conveyors 9 and 12 preferably are separate, the intermediate conveyor does lead to a single cut slicer or slicing machine 6, preferably of the type described in my copending application, Ser. No. 857,035, into which the fruit cylinders are introduced with their cores and preferably their butts and crowns or ends intact and in which the ends are cut off and the intermediate parts of the cylinders are sliced into slices of the desired thickness. The main or inspection endless belt or conveyor 12, like that of the small fruit line, leads from the slicer to the end of the line and has a plurality of transversely spaced concave tracks or grooves contoured to accommodate or receive and support slices upright or on edge. However, here, there preferably are three such tracks, one, preferably at the center, an inspection track 13 aligned with and adapted to receive the slices as they are discharged by the slicer 6 and the others a pair of sorting tracks 14, one at either side of the main belt 12. As in the small fruit line, the slices in this line are inspected and sorted at an inspection station 15 along the main belt immediately beyond the slicer, with three tracks provided on the belt, instead of two, to accommodate the additional machinery required in the processing without overly extending the line by enabling both the perfect slices and those selected as suitable for resizing to be sorted at this station from the remaining slices. In keeping, the preferred coring and can loading machine 16 and resizing and coring machine 21 for processing, respectively, the perfect slices and those selected for resizing are positioned substantially abreast at opposite sides of the main belt 12, each with its feed belt 19 or 20 paralleling and adjacent one of the sorting tracks 14.

Although identical in their coring and loading of perfect slices, the two lines differ in their handling of the slices selected for resizing after these slices have been cored and resized by the coring and resizing machine 21. As mentioned earlier, the lower medium pineapples are of sufficient size to enable them to be sized by the sizing machine 4 to size 2½, thus suiting the perfect initial slices for canning in No. 2½ cans. Unlike small fruit, the resized slices from lower medium fruit are also of a size to be loaded as slices in cans of one of the standard sizes, in this case No. 2T cans. As a consequence, maximum recovery of meat for the solid pack from the lower medium fruit requires the provision of facilities for loading the resized slices. It is this that gives rise to the main difference in the apparatus of the two lines. Thus, in the present line, the discharge belt 22, while extending from the coring and resizing machine 21 to the end of the main line, passes in turn each of a plurality of tandem-arranged can loading machines or loaders 24, preferably of the type described in my copending application, Ser. No. 82,239, filed Jan. 12, 1961, now Patent No. 3,136,103. As in that application, each of the can loaders has a feed belt 25 formed to receive and support the resized slices on edge and paralleling and adjacent to the correspondingly formed discharge belt.

With the above arrangement, the resized slices on the discharge belt 22 are inspected for quality as they approach each loader 24 and those of one grade are sorted from the balance by transferring or shifting them to the feed belt 25 of one of the loaders. For the fine textured meat of the lower medium pineapples, sorting into two grades will ordinarily suffice, one fancy and the other choice, and it is for such sorting that the illustrated line is provided with two loaders, one for each of these grades. Any resized slices not suitable for loading as either grade will be left on the discharge belt and at the end of the line be discharged into the crushed cross conveyor 23 for meat ultimately destined to be crushed. On the other hand, the butt and crown cuts, as well as the slices unsuitable for resizing, which remain in the sorting track 14 on the main belt 12 adjacent the coring and resizing machine 21, will be discharged from that track at the end of the line onto the juice cross conveyor 17 and carried away for processing as juice.

The components of the apparatus or machinery employed in the exemplary processes which are unique to this application are shown only generally in FIGURES 1-4. However, the remaining figures of the drawings are devoted to the details of those components and will now be described in the order in which the components are arranged in the lines.

Figure 6:
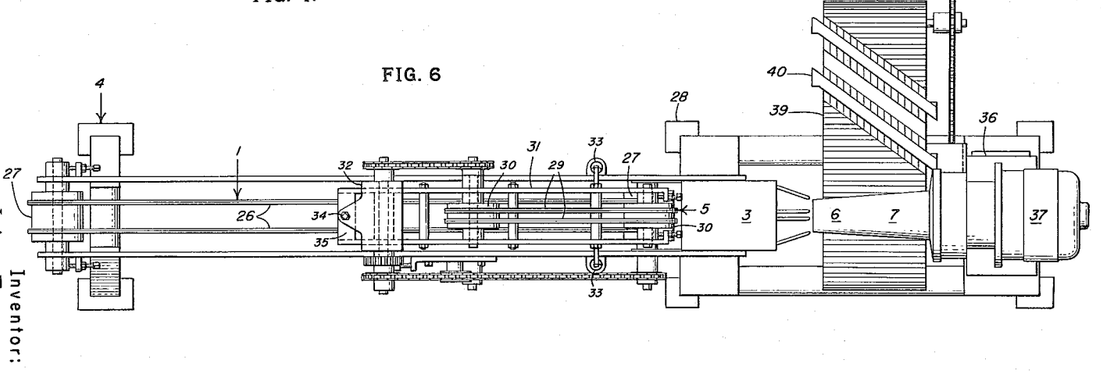
FIGURE 6 is a plan view on an enlarged scale of a preferred embodiment of the feed and sizing apparatus at the head of the line of FIGURE 1 or 3.
Figures 7, 8, 9:
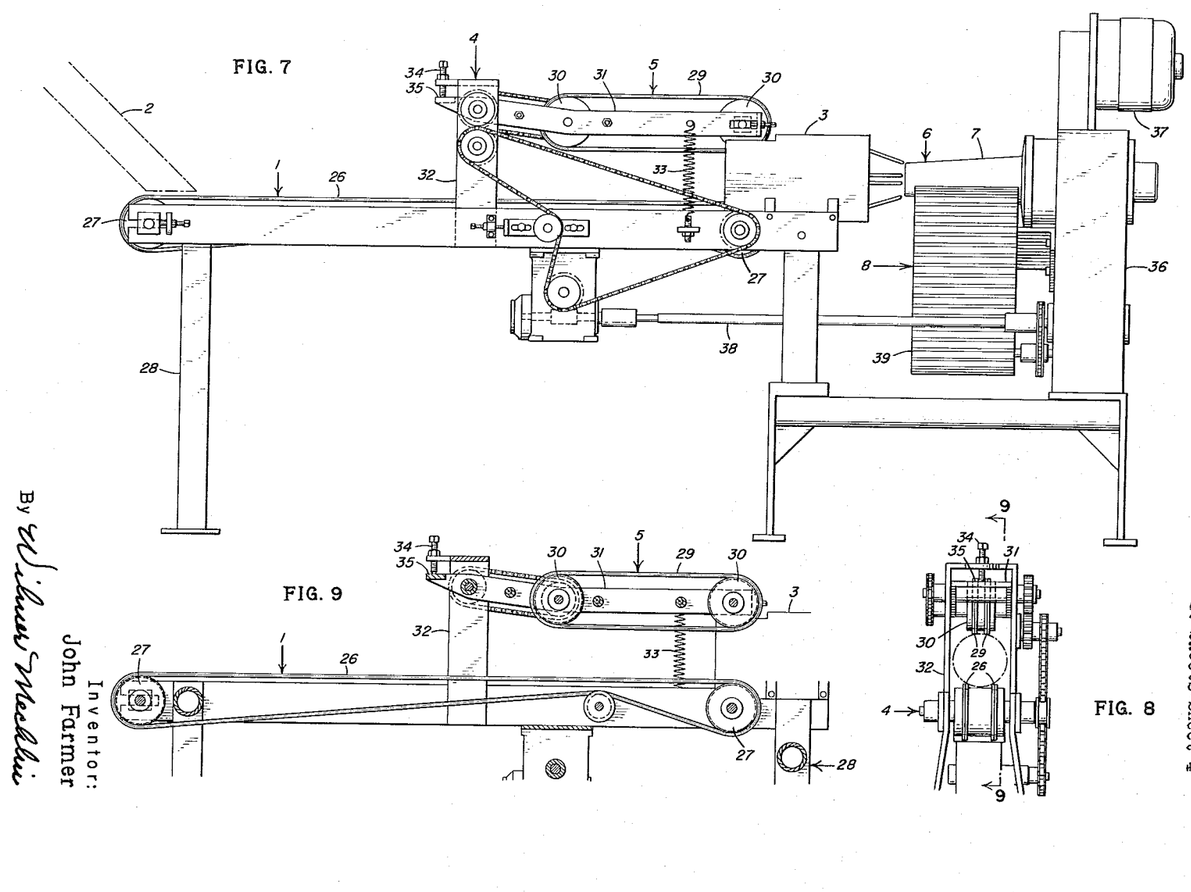
FIGURE 7 is a side elevational view of the apparatus of FIGURE 6.
FIGURE 8 is a fragmentary end elevational view of the feed end of the apparatus of FIGURE 7.
FIGURE 9 is a vertical sectional view taken along lines 9—9 of FIGURE 8.

In the above order, the first of the components to be considered is the feed conveyor 1. In its preferred form, this conveyor is simply a pair of transversely spaced parallel endless V-belts 26 riding at opposite ends of the conveyor over grooved pulleys or rollers 27, one of which, here that at the rear, is a driven pulley and the other an idler adjustable to take up slack. Both of the pulleys conveniently are mounted on a suitable supporting stand 28 and the spacing between the belts is such as to accommodate and receive or support pineapples of the particular size group the processing line as a whole is designed to treat. Centered vertically on the feed conveyor, the cooperating or coacting, overlying spring-urged or loaded belt 5 in its preferred form actually is a pair of V-belts 29 of less transverse spacing than those of the feed conveyor but also riding over a pair of longitudinally spaced grooved pulleys or rollers 30, one driven and the other an idler, the drive pulleys of the feed conveyor 1 and overlying or pressure belt 5 being drivably connected so that their adjoining flights move in the same direction at the same linear speed.

The downward force or pressure by which the pineapples are enabled to be gripped between and positively driven by the several belts is derived from mounting the pulleys 30 of the pressure belt 5 on a frame 31 swingable in vertical alignment with the feed conveyor and swingably mounted adjacent its front end and forwardly of the pulleys on an upright 32 upstanding from the stand 28 intermediate the ends of the feed conveyor and connecting the frame between the pulleys to the stand by a coil or other suitable tension spring 33. Downward swinging of the frame 31 under the combined force of gravity and the tension spring 33 in turn is limited by a bolt or like adjustable stop 34 mounted on the upright 32 and engageable with an underlying abutment 35 on the frame 31 forwardly of the latter's pivot. With the contiguous flights of the belts of the pressure belt and feed conveyor arranged to run substantially parallel, as well as in the same direction, in gripping a pineapple and the adjustment of the stop 34 such that it limits the downward swinging of the frame 31 only in the absence of a pineapple, the pressure belt not only assists the feed conveyor in driving pineapples along the line but enables the several belts to grip a pineapple with substantially uniform force during the period in which it is passing therebetween.

Since, like the flighted feed conveyor of a Ginaca machine, the feed conveyor 1 and pressure belt 5 are capable of centering pineapples generally but not exactly on the sizing knife 6 of the sizing machine 4, the exactness required in the sizing is performed by an intervening centering head 3 of conventional type which conveniently is mounted on the stand 28. The feed conveyor and pressure belt both terminate at the centering head and lose direct contact with a pineapple as it passes into the head. On a single pineapple they thus would be ineffective, since the momentum they could apply would hardly suffice to push the pineapple through the sizing knife. However, once a train of pineapples in end contact is established between the feed conveyor and pressure belt on the one hand and the sizing knife on the other, and such a train will always build up, regardless of how haphazardly or irregularly pineapples are fed to the conveyor, by a stoppage of the leading pineapple as it contacts the knife, the pressure of the conveyor and belt on succeeding pineapples, exerted through the train, will positively push each pineapple into and through the sizing knife.

Figure 10:
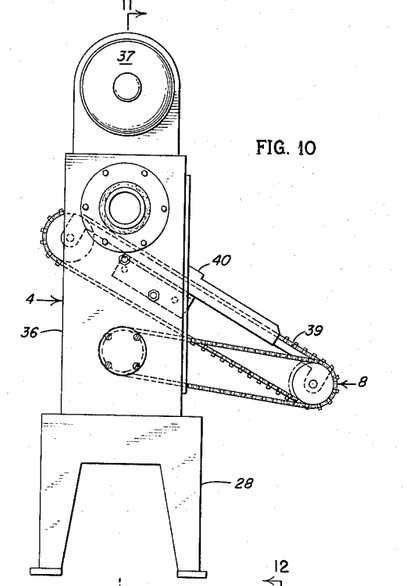
FIGURE 10 is an end elevational view on the scale of FIGURE 7 taken from the discharge end of the sizing machine of that figure.
Figure 11:
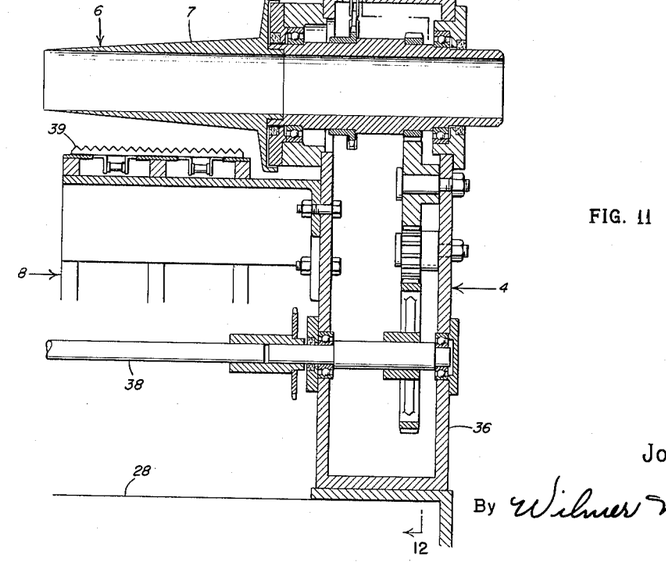
FIGURE 11 is a vertical sectional view on an enlarged scale taken along lines 11—11 of FIGURE 10.
Figure 12:
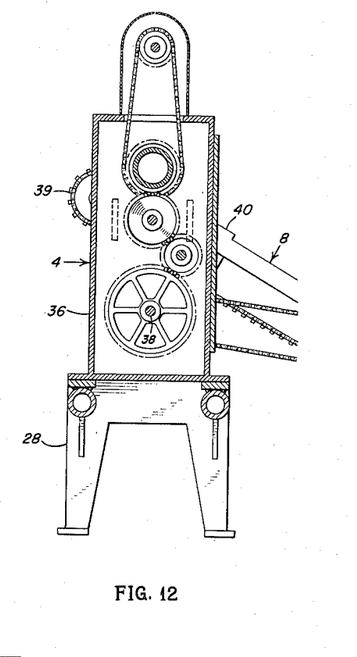
FIGURE 12 is a vertical sectional view on the scale of FIGURE 10 taken along lines 12—12 of FIGURE 11.

The sizing machine 4 to which the pineapples undergoing processing are fed for sizing through the centering head 3 is incomparably simpler than a Ginaca machine. The main element, the rotary tubular sizing knife 6, is similar to that of a Ginaca in having a through axial cylindrical bore or throat (not shown) of a diameter suitable for the particular group of pineapples being processed and a frusto-conical, forwardly tapered outer surface 7 over its front portion to split the shells as they are cut from the fruit. In the preferred machine, the sizing knife is mounted for rotation about a substantially horizontal axis in a housing 36 which also mounts the shell eradicator 8 and is surmounted by a drive motor 37. The housing in turn is mounted or supported on a part of the stand 28 which is made integral or rigid with the balance to facilitate alignment of the sizing knife and centering head.

In the preferred arrangement, the motor 37 not only drives the sizing knife 6 but, through a suitable drive connection (not shown) in the housing 36, also drives a take-off or drive shaft 38 which in turn, through appropriate connections, drives the feed conveyor 1 and the pressure belt 5, as well as the shell eradicator 8. The last element, the shell eradicator, is conventional in having a ribbed or slotted belt 39 onto which the split shells drop, meat side up, and a slitting and cutting device 40 for cutting the meat from the skin in a form usable as chunks or in the crushed pack, depending on its size and quality. As mentioned in describing the illustrated processes, the sizing machine 4 is not designed to perform any operations on the fruit other than sizing and, preferably, shell eradication and discharges the fruit as fruit cylinders with their butt and crown ends and cores intact.

The next of the novel machines used in the illustrated processing lines, the coring and can loading machine 16 by which the perfect slices sorted from the output of the slicer 10 are cored and loaded into cans, is shown in detail in FIGURES 13-16. As mentioned earlier, the preferred coring and can loading machine 16 is positioned along the line at a side of the main conveyor or feed belt 12 beyond the second inspection station 15 and has a feed belt 19 paralleling the main belt onto which the perfect slices are transferred directly from a sorting track 14. Formed or contoured to receive and support the slices upright or on edge, the feed belt 19 feeds the slices in that manner onto an aligned, correspondingly contoured accumulator or supply trough or shelf 41 fixed to a side of a housing 42 and leading to a multi-barrelled turret 43. Rotatable on a substantially horizontal axis on a spindle or shaft 44 journalled in the same housing, the turret 43 has its open-ended barrels 45, here six, arranged uniformly about the axis of the spindle and may mount them between a pair of end discs. However, as in the illustrated embodiment, the multiplicity of barrels may be carried by a single face or front end disc or plate 46.

Figure 13:
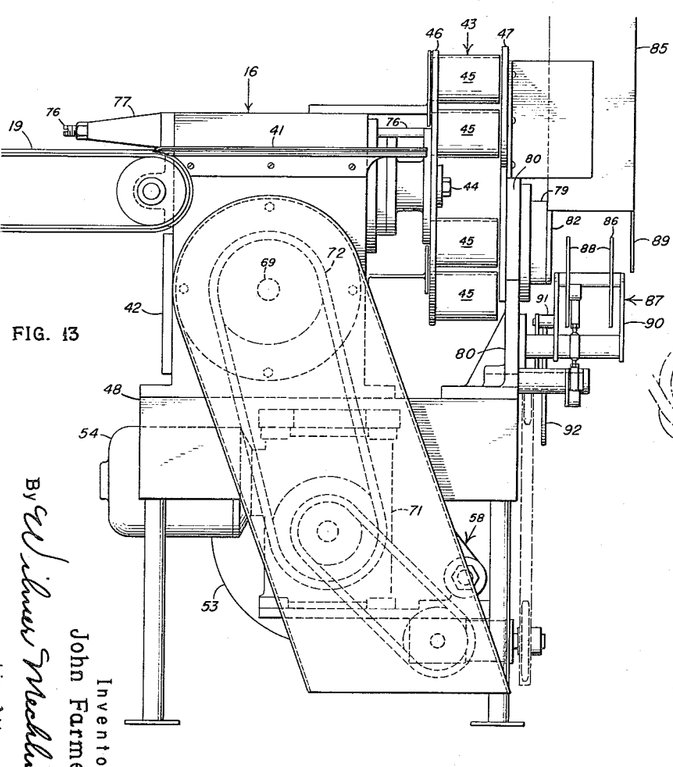
FIGURE 13 is a side elevational view taken from one side of a preferred embodiment of the coring and can loading machine of either line.
Figure 14:
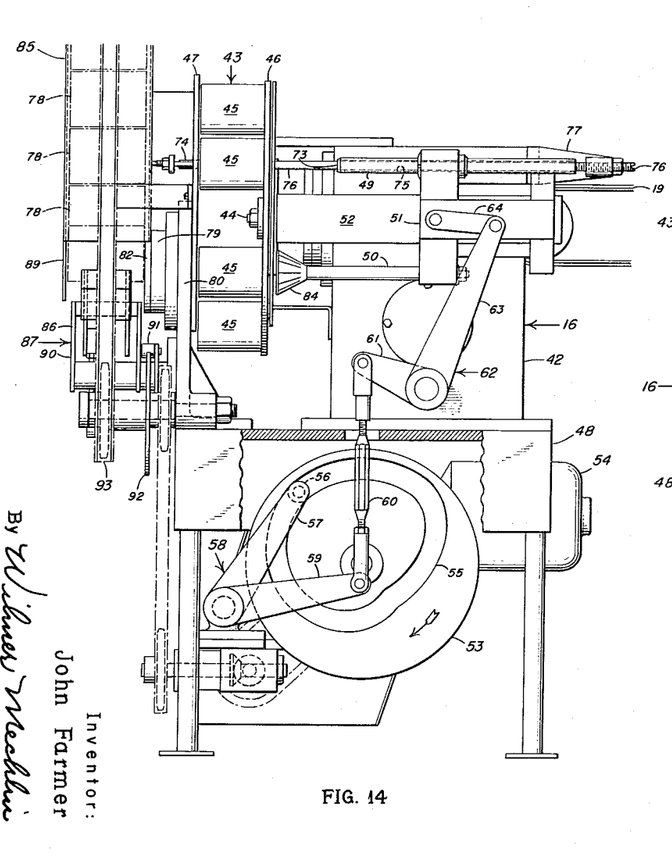
FIGURE 14 is an elevational view of the opposite side of the machine of FIGURE 13, with portions broken away and shown in section to more clearly illustrate certain of the details of construction.

Suitably fixed or anchored to and opening forwardly through and projecting rearwardly from the face disc 46, each of the barrels 45, in one of the stops or dwells of the turret, aligns with and is adapted to receive slices from the accumulator trough 41. Conversely, during indexing, the turret confronts the trough with the blank or solid portions of its face disc intermediate the barrels. Consequently, while the machine is operating, each stop or dwell of the turret will present a barrel for loading at the loading position and an accumulation of slices sufficient to fill the accumulator trough 41 will enable the pressure or friction of the feed belt 19 on following or succeeding slices to push the slices at the discharge end of the trough into the presented barrel until the end slice abuts a stop or backing plate 47 fixed to and upstanding from the base 48 of the machine and covering or closing the rear end of the barrel in loading position. With each of its barrels so loaded, the turret during indexing uses its face disc 46 as a stop to hold back the remaining slices on the accumulator trough against the pressure of the belt. The capacity of the barrels 45 is the same as that of the cans into which the slices are to be loaded and each barrel as it moves in the indexing of the turret is adapted to present its load of slices first for coring and then for loading into cans.

In the preferred machine, the coring and can loading steps in its operating cycle are performed at sequential dwells of the turret. This is accomplished by mounting a coring tube 49 for coring the slices and a pusher or plunger 50 for discharging cored slices into cans in transversely spaced relation on a crosshead 51 slidably mounted on a slide or guide bar 52 fixed to a side of the housing 42 opposite that carrying the accumulator trough 41, with the spacing between the tube and pusher and their positions relative to the turret such that the pusher will act on the slices in one barrel as the tube acts on those in the next or succeeding barrel. Sliding horizontally on the slide bar 52, the crosshead 51 is reciprocated in synchronism with the indexing of the turret by a suitable drive, here in the form of a cam 53 driven off a motor 54 mounted in the base 48 and having a cam track 55 engaged by a roller 56 on one arm 57 of a bellcrank 58 pivoted to the base. The upper or other arm 59 of the bellcrank is connected through an adjustable linkage 60 to a lower arm 61 of a second bellcrank 62 pivoted to the housing 42 and having its opposite or upper arm 63 connected by a link 64 to the crosshead 51. Turning in the direction indicated by the arrow in FIGURE 14, the cam 53, as it turns, will advance or drive the crosshead 51 forwardly from the zero, at rest or retracted position shown in that figure toward the turret, this forward motion or advance stroke continuing until the coring tube 49 and pusher 50 have completed their operations, at which point, still under control of the cam, the crosshead begins its retract stroke, ultimately to return to its initial or at rest position.

Figure 15:
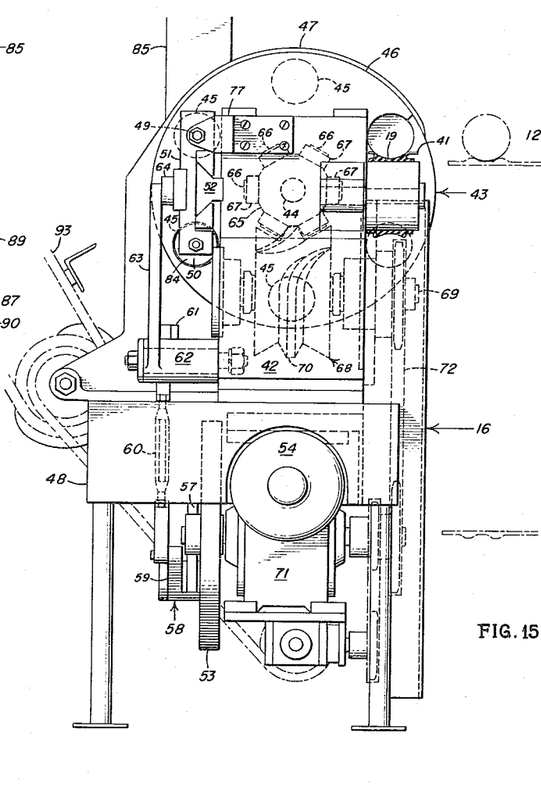
FIGURE 15 is an elevational view of the feed end of the machine of FIGURE 13.

The turret 43 in turn may be indexed by a geneva drive or an interrupted gear mechanism. However, because of the relatively long dwell and smooth acceleration and deceleration characteristics it is preferred to employ a Ferguson cam and roller gear drive. As indicated in FIGURE 15, the preferred drive has a hub 65 fixed to the spindle 44 and carrying a plurality of radially extending stub shafts 66 corresponding in their number and angular relation to the stops in the cycle of the turret and each mounting a roller follower 67. For turning the hub 65 and therethrough the spindle 44, there is provided a cam 68 mounted on an axle or shaft 69 disposed at right angles or normal to the spindle and having a central circumferential cam rib 70 which generally is straight but is interrupted at one point in its periphery with its ends at opposite sides of the interruption or break turned or curved oppositely toward opposite faces of the cam. The rib 70, during the greater part of a full rotation of the cam, presents its intermediate straight part for engagement and straddling by a pair of adjoining followers 67, which, as they are approached by the break in the rib, follow the turn in the rib's adjoining end, in process disengaging one of the followers from the rib and engaging the other follower and the adjoining follower on its other side with the rib's opposite end.

The successive disengagement and engagement of pairs of followers 67 with the ends of the rib 70, by forcing the hub 65 to turn through the angle or arc between adjoining followers, indexes the turret 43 between stops, while the succeeding engagement of the straight intermediate portion of the rib by a pair of followers holds the turret against rotation in one of its stops or dwells. It is, of course, necessary that the indexing of the turret and the strokes of the crosshead 51 be synchronized so that the crosshead will advance only when the turret is at one of its stops, this here being accomplished by driving the crosshead cam 53 off the motor 54 by suitable reduction gearing 71 and drivably connecting the indexing cam 68 to the crosshead cam 53 by a chain and sprocket drive 72.

Driven in the above manner in synchronism with indexing of the turret 43, the coring tube 49 cores the slices in one of the barrels 45 at one stop of the turret and at the next stop the pusher 50 acts to push or eject the cored slices from the barrel. To ensure that the cutting end 73 of the coring tube will not be clogged by cores from a preceding coring as it enters a particular barrel, the coring tube is so mounted on the crosshead 51 as to project through and somewhat beyond the rear end of the presented barrel on completion of its advance stroke and there is mounted on the fixed backing plate 47 an axially adjustable thrust pin 74 aligned axially with the coring tube and adapted to be received by or enter into the cutting end of the tube as the latter completes a coring operation. If the coring tube 49 has its bore 75 open except for cores as its cutting end 73 receives the thrust pin 74, the action of the thrust pin, in pushing back the cores to unclog that end of the tube, will complete the action initiated during the particular coring operation of ejecting a full load of cores from the tube's opposite end. In such case, the thrust rod 76 shown in FIGURE 14 is slidably received by and extending through the bore 75 of the coring tube 49 to the face plate 46 of the turret 43, will have been removed to clear the bore. The purpose of this thrust rod 76 is to enable cores to be cut from the slices in the presented barrel without disturbing their position in the slices, so that the cores can be loaded with the slices as a novelty item. If this, rather than removal of the cores, is the result desired, the thrust rod, conveniently mounted for axial adjustment on a bracket 77 fixed to the housing 42, will be positioned as shown in FIGURE 14.

Figure 16:
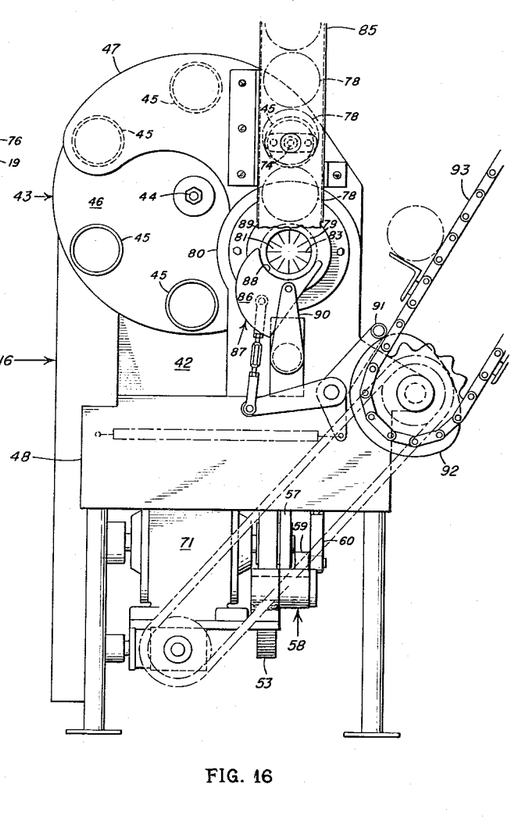
FIGURE 16 is an elevational view of the discharge end of the machine of FIGURE 13.
Figure 17:
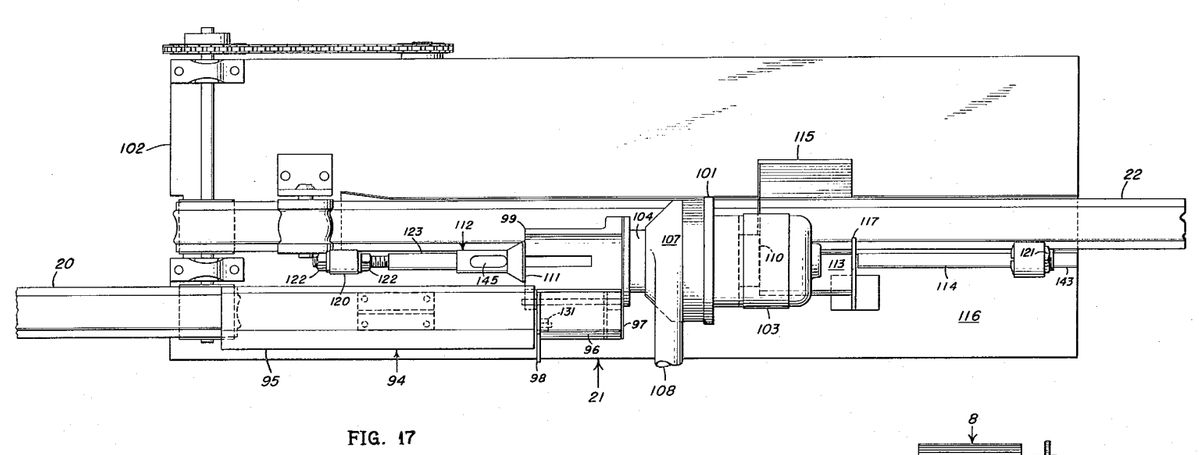
FIGURE 17 is a plan view on an enlarged scale of a preferred embodiment of the coring machine of either processing line.

With the coring operation cutting the cores from the slices and, as desired, either removing them or leaving them in place, the batch of cored slices in the particular barrel 45 is subjected at the next stop of the turret to the action of the pusher 50 and pushed, ejected or discharged thereby from the turret into an empty can 78 open at one end and held at that time in alignment with the barrel with its open end confronting the barrel's rear end. If the slices are to be canned as such, the stroke of the pusher will be so regulated as to push the batch from the barrel through the backing plate 47 directly into the can. Should it be so desired, instead, to load the slices as tidbits, this can be accomplished by interposing between the backing plate and the empty can a cutter head 79 mounted on the backing plate or, more suitably, on a support bracket or plate 77 therefor rigid with the base 48 and having a throat or bore 81 of the diameter of and aligned with the presented barrel and carrying, conveniently on a detachable ring 82, a plurality of circumferentially spaced cutters 83 instanding radially into the throat to the depth of the slices. With the head 84 of the pusher 50 radially slotted in correspondence with the cutters 83 so as to pass therethrough, the pusher is adapted, by correspondingly regulating its axial movement relative to the turret, to push the batch through both the barrel and the cutter head into the presented empty can and, by replacing the removable cutter-carrying ring 82 by a plain ring, the cutter head can be left in place when it is desired to load the slices as such.

In order to have an empty can presented for loading at the barrel aligned with the pusher 50 at each stop of the turret 43, provision is required for feeding empty cans to loading position, as well as for holding them in that position during loading and subsequently ejecting the loaded cans onto a disc, elevator or other suitable conveyor for distribution to a can closing machine. The illustrated machine makes such provision by an arrangement somewhat similar to that employed in the can loading machine shown in my copending application, Ser. No. 82,239. As in that application, the empty cans 78 are fed by gravity to loading position by a feed chute 85 fixed to and upstanding from the backing plate 47, each as it reaches the bottom of the chute being first held therein by engagement with the convexly curved back 86 of an oscillatable can shifter 87 and then, as the shifter oscillates, dropping into a pocket 88 in the shifter in which the can is held during loading, the can at this stage being backed by a stop or supplemental backing plate 89 conveniently formed integrally with and depending from the outer side of the chute. Itself pivotally mounted on a support arm 90 fixed to the support bracket 80 and controlled in its oscillations by the engagement of a connected spring-urged follower 91 with a cam 92 synchronized in drive with the turret 43 and crosshead 51, conveniently by being driven off the same motor 54, the can shifter 87, on completion of the loading operation, ejects the loaded can onto a suitable conveyor, here in the form of a flighted chain elevator 93, also driven off the same motor for distribution to the closing machine (not shown).

The last of the machines unique to the practice of the process of this invention is the coring and resizing machine, the details of which appear in FIGURES 18–25. In the preferred embodiment shown in those figures, the machine in large part is similar to the resizing machine illustrated in my copending application, Ser. No. 82,240, filed Jan. 12, 1961. Thus, as in that application, the slices selected for resizing, in this case with their cores intact, are transferred in sorting from the main belt 12 onto the feed belt 20 formed or contoured to receive and support the slices upright or on edge and are fed by that belt onto a correspondingly formed or contoured accumulator or supply trough 94 having a fixed lead or front section 95 and a swingable or oscillatable trailing or rear section 96. Also as in that application, the swingable rear section 96 is blocked or bounded at the rear by a fixed stop plate 97 for limiting forward progress of slices under force of the belt 20 on succeeding slices and has fixed to and depending from its front end a sweep 98 which stops or holds slices on the fixed front section 95 when the normal longitudinal alignment of the two sections is disturbed by swinging of the rear section.

Figure 18:
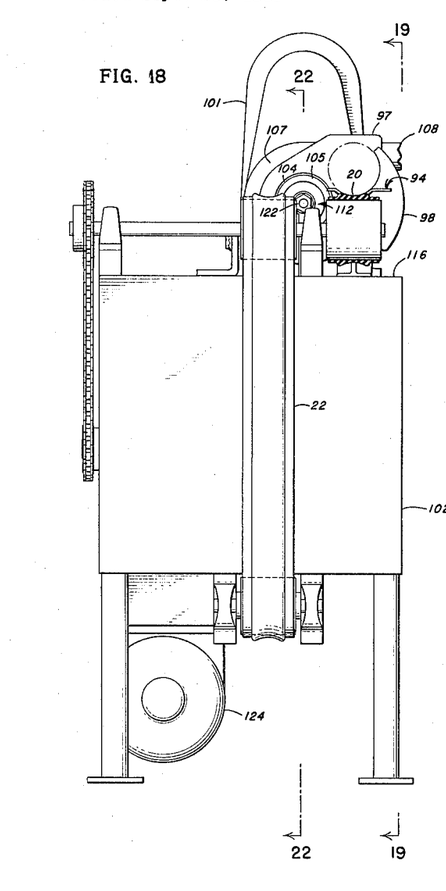
FIGURE 18 is a vertical sectional view of the machine of FIGURE 17 taken along lines 18—18 of FIGURE 19.
Figure 19:
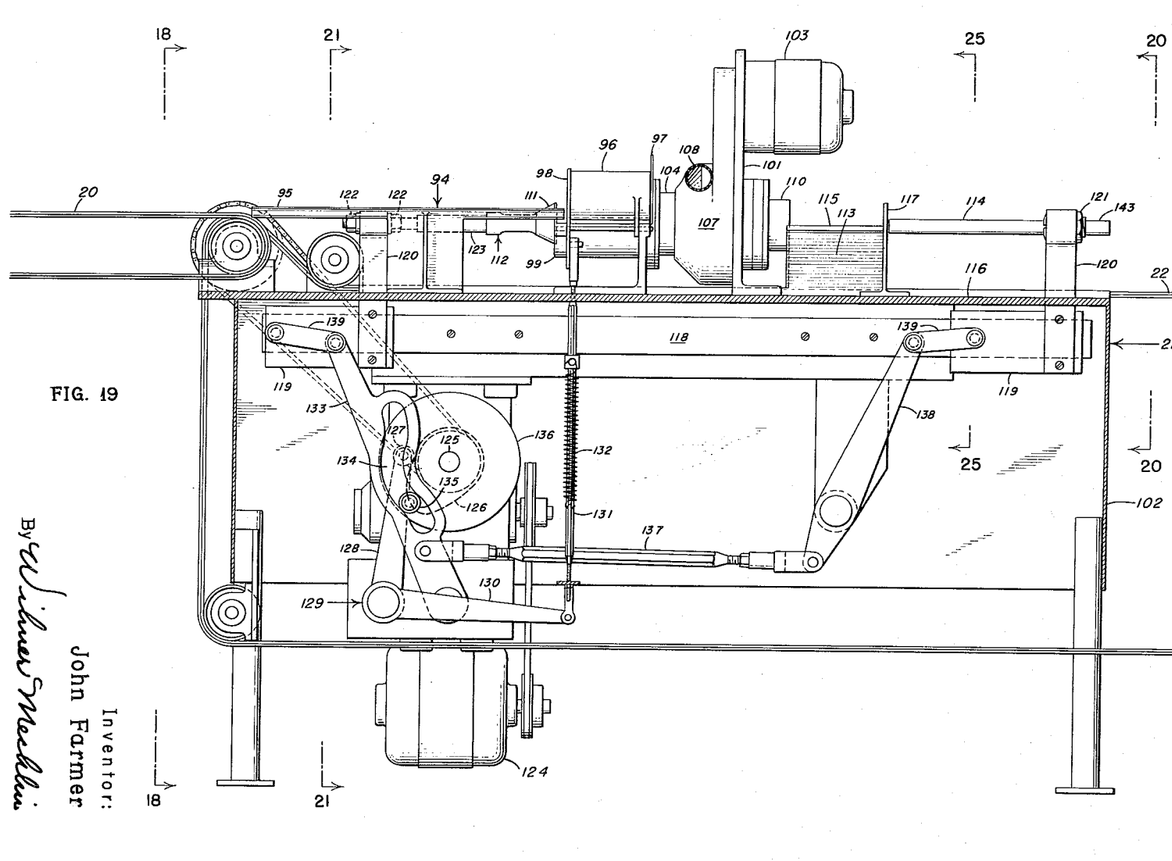
FIGURE 19 is a vertical sectional view taken along lines 19—19 of FIGURE 18.

The swinging mounting of the rear or transfer section 96 enables it at the inner limit of its swing to transfer a batch of slices to a centering trough 99 disposed parallel to but offset to one side of the accumulator trough. Corresponding in contour to the accumulator trough, the centering trough 99 is aligned longitudinally or coaxial with a resizing knife 100 mounted for rotation about a substantially horizontal axis in a housing 101 supported by a stand 102 and conveniently driven by an electric motor 103 surmounting the housing.

Figure 22:
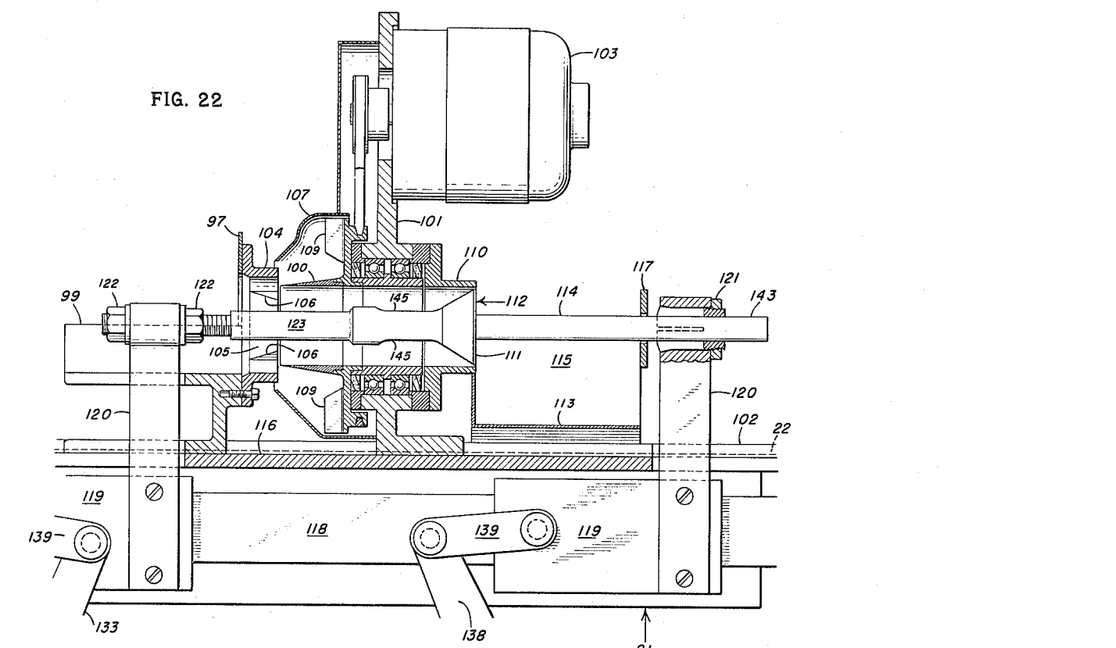
FIGURE 22 is a fragmentary vertical sectional view on an enlarged scale taken along lines 22—22 of FIGURE 18.

To hold each slice against turning during resizing, there preferably is interposed between the centering trough 99 and the resizing knife 100 a collar, sleeve or tube 104 which may be releasably mounted on the centering trough and has a cylindrical bore 105 of the size of the slices, the bore being interrupted by a plurality of circumferentially spaced blades or knives 106 instanding thereinto preferably to the depth of the peripheral portion of each slice to be removed in the resizing. These blades not only hold the slices against turning during resizing but radially cut their outer portions, thus causing those portions to divide into segments when they are cut in the resizing from the central portions of the slices. In case the portions removed in the resizing are to be consigned to the juice pack, as will be the case except in processing large fruit, it is preferred to mount about the leading portion of the resizing knife 100 a hood or shield 107 having a spout 108 directed toward or over a midpart of the main belt 12 and to mount within the hood paddles or impellers 109 fixed for rotation with the knife for impelling the removed portions through the spout onto the main belt so that they can be carried by the latter to the end of the line and deposited on the juice cross conveyor 17.

The illustrated embodiment has a second collar, sleeve or tube 110 mounted at the rear of the resizing knife 100 and having a smooth, cylindrical bore of the size of the resized slices and aligned axially or coaxial with the knife. Although this construction will suffice for the lower medium fruit line in which the resized slices usually will be inspected and sorted subsequent to the resizing for loading into cans as meat of any of a plurality of different grades, a different requirement is met in the small fruit line in which the resized slices are too small for loading as slices, if it is desired to can the resized slices as tidbits rather than as part of the crushed pack. In such case, the smooth-bored rear sleeve 110 will usually be replaced by a fixed sleeve having a bore of the same inside diameter but, like the cutter head 79 shown in FIGURE 16, carrying a plurality of circumferentially spaced fixed blades or cutters instanding radially into the bore to the depth of the resized slices after they have been cored. Correspondingly, the preferred frusto-conical head 111 of the pusher or plunger 112 by which the batch of slices is forced through the resizing knife will be radially slotted to enable the head to move past the blades and eject or discharge the slices in tidbit form onto a transversely directed slide or deflector 113 leading to the discharge conveyor 22, the latter being offset transversely from the axis of the knife and extending to the rear or discharge end of the line for transporting the tidbits to a can loader 24 such as used in the line of FIGURES 3 and 4.

With the pusher 112 adapted to provide a positive force for pushing a slice entirely through the resizing knife 100 and associated front and rear collars 104 and 110, no gravity assist is necessary and the axis of the knife and the coaxial pusher can be horizontally disposed. To enable it to act on a batch of slices deposited on the centering trough 99 by the transfer section 96 of the supply trough 94, the head 111 of the pusher 112, in normal, retracted or at rest position, is disposed substantially at the front end of the centering trough.

Figures 20, 25:
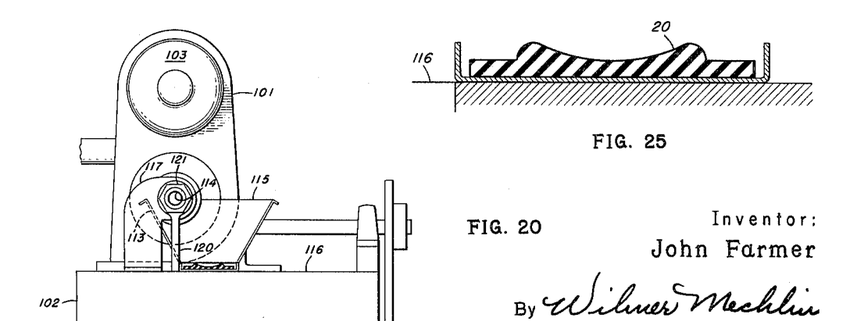
FIGURE 20 is a fragmentary vertical sectional view taken along lines 20—20 of FIGURE 19.
FIGURE 25 is a fragmentary vertical sectional view on an enlarged scale taken along lines 25—25 of FIGURE 19.
Figure 21:
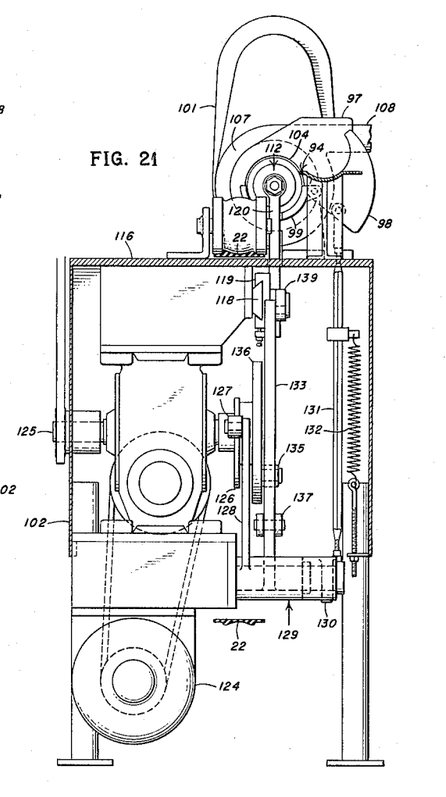
FIGURE 21 is a vertical sectional view taken along lines 21—21 of FIGURE 19.

The resizing and coring machine 21 is designed to core the slices as they are resized and for this purpose is fitted with an open-ended coring tube 114 coaxial with the resizing knife 100 and adapted to act on the batch of slices from the rear in opposition to the action of the pusher 112. In order that it may core the slices while they are in and supported circumferentially by the resizing knife 100 and the rear collar 110, without interfering with deflection of discharged slices by the transfer slide 113 onto the discharge conveyor or belt 22, the coring tube 114 in its normal, retracted or at rest position is disposed rearwardly and clear of the slide 113, which in turn is positioned at the discharge end of the rear collar. As shown in FIGURES 19, 20 and 22, the slide 113 may be one side of a guide chute 115, the sides of which converge downwardly toward the discharge belt to direct the resized slices or tidbits thereonto and, for resized slices discharged as such rather than as tidbits, there is fixed to the platform 116 directly mounting the housing 101 at the rear of the guide chute 115 a wiper arm 117 apertured to receive the coring tube and wipe or remove cored slices therefrom as the tube retracts to normal position.

With the pusher 112 and coring tube 114 normally disposed in their retracted positions, it of course is necessary that each be slidable or reciprocable horizontally to and from their advanced positions, to enable them to act as intended on the slices. To this end, there is attached or fixed to the stand 102 of the machine below the platform 116 a slide bar or guide track 118 extending horizontally substantially the length of the stand and slidably mounting toward opposite ends a pair of longitudinally spaced carriages or slide blocks 119 to each of which is fixed or attached an arm or upright 120 extending upwardly through the platform and socketed thereabove to receive the pusher 112 or coring tube 114, as appropriate. Both the pusher and the coring tube preferably are made axially adjustable in their mountings by suitable means, such as the jam nut 121 in the case of the coring tube and, for the pusher, nuts 122 threaded to the shank 123 of the pusher at opposite sides of the associated arm 120.

In the cycle of operation of the resizing and coring machine 21, the transfer section 96 of the supply trough 94 first swings to deposit a batch of slices in the centering trough 99. The pusher 112 then pushes the slices through the resizing knife 100 and the coring tube 114 acts at the same time, concurrently or coincidentally, on the opposite end of the batch to core the slices. In the preferred machine, the oscillation of the transfer section and reciprocation of the carriages 119 on the slideway provided by the guide bar 118 and therethrough the corresponding movements of the pusher and coring tube, are all preferably made the responsibility of a single drive motor 124 mounted on the stand 102 below the platform 116 and drivably connected to the several operating elements for driving them in synchronism and this motor also is used to drive both the feed and discharge belts 20 and 22. In the case of the transfer section, the motor 124 is drivably connected through reduction gearing to a drive shaft 125 to which is fixed a cam 126 engaged by a roller 127 carried by one arm 128 of a bellcrank 129, and other arm 130 of which is connected by an adjustable linkage 131 to the transfer section 96, the linkage also conveniently being attached to one end of a tension spring 132 anchored at the other to the stand 102 for urging the roller into engagement with the cam. The pusher 112 and coring tube 114 in turn are reciprocated in opposite directions by a driving connection to the motor which includes a lever 133 pivoted at its lower end to the stand and having intermediate its ends a cam slot 134 in which rides a crank or eccentric roller 135, the crank arm of which conveniently is a disc 136 fixed to the drive shaft 125. This first lever 133 is connected, intermediate its pivot and the cam slot 134, by an adjustable link 137 to the lower end of a second lever 139 pivotally mounted intermediate its ends on the stand. The driving connection is completed by a pair of links 139, one connecting the upper end of the first or pusher lever 133 to the carriage 119 of the pusher 112 and the other correspondingly connecting the second or coring tube lever 138 to the carriage of the coring tube 114.

Figure 23:
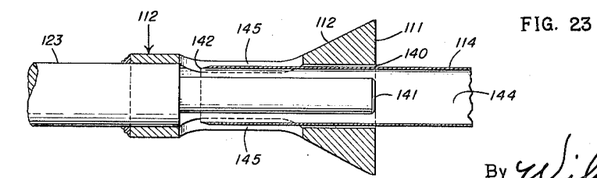
FIGURE 23 is a fragmentary longitudinal sectional view on an enlarged scale taken centrally through the plunger and coring tube of FIGURE 22.
Figure 24:
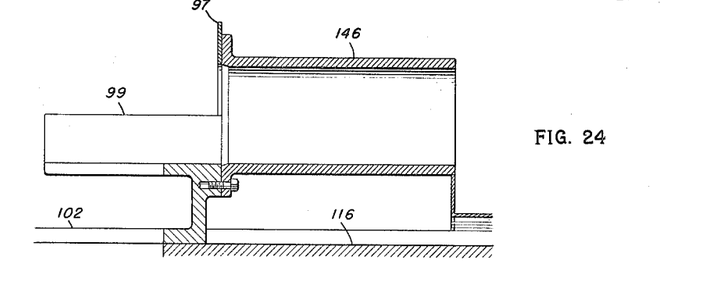
FIGURE 24 is a vertical sectional view on the section of FIGURE 22 of a sleeve interchangeable with the resizing means of FIGURE 22 for adapting the machine of the latter figure for coring without resizing.

Although the coring tube 114 could be driven to first contact and then retreat before the confronting end of the pusher head 111, it is preferred for relative simplicity of drive and also to facilitate ejection of cores from the tube, that contiguous portions of the tube and pusher head overlap and interfit longitudinally or axially in the course of their reciprocal movements. For this purpose, the pusher head 111 is provided with an axial socket 140 opening rearwardly toward and adapted to accommodate or receive the confronting end portion of the coring tube and a push or thrust pin 141 within and concentric or coaxial and substantially coextensive axially with the socket, the push pin being adapted to be received or accommodate in the end portion of the coring tube as the latter is received in the socket. With this construction, the coring tube will cut through the slices and continue into the pusher head as each completes its advance stroke and in process the push pin 141 will push the cores rearwardly away from the cutting end 142 of the tube, unclogging the latter and, if the tube is then filled, ejecting a corresponding length of cores from the rear end 143 of the tube. In addition to its ability to unclog the bore 144 of the coring tube 114 adjacent the latter's cutting end 142 by action of its push pin 141, the head is rendered self-cleaning to prevent its socket from becoming clogged by juice or other matter clinging to the exterior of the received end portion of the tube, by the provision of radial cleaning slots 145 opening onto the socket and preferably extending from its inner toward its outer end.

The above described coring and resizing machine 21 is suitable for use in processing any of the several groups of pineapples from small to large, its adaptation to the resizing and coring of slices which subsequently are inspected and sorted for canning according to grade simply entailing the forming of the discharge belt 22 as indicated in FIGURE 25, so that it will support the cored and resized slices upright to facilitate subsequent handling. However, with a simple further modification, the same basic machine is also adapted to core the initial unspotted slices from upper medium fruit which, because of variations in their quality, must be sorted and canned according to grade. In the processing of such fruit, the coring and can loading machine 16 of the small and lower medium processing lines is replaced by a coring machine and the output of the latter after inspection and sorting is loaded according to grade by a plurality of the can loading machines 24 such as described in connection with the lower medium fruit line of FIGURES 3 and 4 but in this case following the coring machine rather than a coring and resizing machine. The modification involved in the adaptation of the coring and resizing machine 21 to such use is the replacement of the tube assembly consisting of the resizing knife 100 and its attendant front and rear collars or tube 104 and 110 by a smooth-bored open-ended tube or sleeve 146 of the same over-all length as the assembly but of the inside diameter of the front collar. Illustrated in FIGURE 24, the tube 146, interchangeable with the resizing knife and associated collars, is readily mountable on the rear end of the centering trough 99 in place of the front collar 104 of the illustrated machine and, when in place, enables the machine to core initial slices, the operation being exactly the same as that described for the illustrated machine except that the slices are not resized.

From the above detailed description, it will be apparent that there has been provided an improved process and apparatus by which pineapples of all sizes can be processed economically for canning of their edible fruit as part of the solid pack. It should be understood that the described and disclosed embodiments are merely exemplary of the invention and that all modifications are intended to be included that do not depart from the spirit of the invention or the scope of the appended claims.

Having described my invention, I claim:

1. A process for treating pineapples comprising sizing pineapples into fruit cylinders with their cores intact, slicing the cylinders into slices, and coring selected of said slices.

2. A process for treating pineapples comprising sizing pineapples into fruit cylinders with their cores and ends intact, slicing the cylinders to cut off the ends and cut the remainder into slices of the desired thickness, and coring selected of said slices.

3. A process for treating pineapples comprising sizing pineapples into fruit cylinders with their cores intact, slicing the cylinders into slices, coring and loading the slices suitable for loading as such as part of the solid pack, and resizing and coring and subsequently loading slices selected from the remainder as having meat salvageable by resizing for packing as part of the solid pack.

4. A process for treating pineapples comprising sizing pineapples into fruit cylinders with their ends and cores intact, slicing said cylinders transversely to cut off the ends and slice the remainder into slices of the desired thickness, coring certain of said slices, loading said certain slices into cans, resizing and coring other of said slices, and loading the resized slices into cans.

5. A process for treating pineapples comprising sizing pineapples into fruit cylinders with their ends and cores intact, slicing each cylinder transversely to slice it into slices of the desired thickness and in the same operation cut off its ends, concurrently coring certain of said slices and loading the meat therefrom into cans, resizing and coring other of said slices, and subsequently loading the meat from the resized slices into cans.

6. A process for treating pineapples comprising sizing pineapples into fruit cylinders with their ends and cores intact, slicing each cylinder transversely to slice it into slices of the desired thickness and in the same operation cut off its ends, coring certain of said slices without removing the cores and concurrently loading the edible meat from the cored slices and the cores together into cans, resizing and concurrently coring other of said slices without removing the cores, and subsequently loading the edible meat from the resized slices together with the cores into cans.

7. Apparatus for processing pineapples comprising in sequence means for sizing pineapples into fruit cylinders with their cores intact, means for slicing the fruit cylinders transversely into slices, and means for coring certain of said slices and loading the meat therefrom into cans.

8. Apparatus for processing pineapples comprising in sequence means for sizing pineapples into fruit cylinders with their cores intact, means for slicing the fruit cylinders transversely into slices, means for coring and loading the meat from certain of said slices into cans, means for resizing and coring other of said slices, and means for loading the meat from the resized slices into cans.

9. Apparatus for processing pineapples comprising means for sizing pineapples into fruit cylinders with their ends and cores intact, means for feeding pineapples irregularly to said sizing means, means for slicing said fruit cylinders transversely into slices to cut off the ends and cut the remainder into slices of the desired thickness, means for coring and loading the meat from certain of said slices into cans, means for resizing and coring other of said slices, and means for loading the meat from the resized slices into cans.

10. Apparatus for processing pineapples comprising means for sizing pineapples into fruit cylinders with their ends and cores intact, means for transversely slicing the cylinders one slice at a time to cut off the ends and cut the remainder into slices of the desired thickness, means for cyclically coring and loading into cans the meat from certain of said slices, means for resizing and coring other of said slices, and means for loading into cans the meat from said resized slices.

References Cited by the Examiner

UNITED STATES PATENTS

| | | | |
|---|---|---|---|
| 482,493 | 9/1892 | Zastrow | 146—6 |
| 891,555 | 6/1908 | Lindsay | 146—6 |
| 1,142,217 | 6/1915 | Wolf | 146—6 |
| 1,671,723 | 5/1928 | Jagenburg | 146—6 |
| 2,023,810 | 12/1935 | Horner | 146—238 |
| 2,053,238 | 9/1936 | Dulany | 146—6 X |
| 2,092,773 | 9/1937 | Nordquist et al. | 53—123 |
| 2,178,884 | 11/1939 | Thompson | 53—123 |
| 2,190,936 | 2/1940 | De Back | 53—23 |
| 2,369,753 | 2/1945 | Papendick | 53—23 |
| 2,652,915 | 9/1953 | Fox | 146—6 X |
| 2,765,829 | 10/1956 | De Back et al. | 146—6 |
| 3,057,386 | 10/1962 | Massaro | 146—6 X |

ROBERT C. RIORDON, *Primary Examiner.*

CARL W. ROBINSON, J. SPENCER OVERHOLSER,
*Examiners.*